(No Model.) 3 Sheets—Sheet 1.
T. B. JEFFERY.
VELOCIPEDE.
No. 379,276. Patented Mar. 13, 1888.
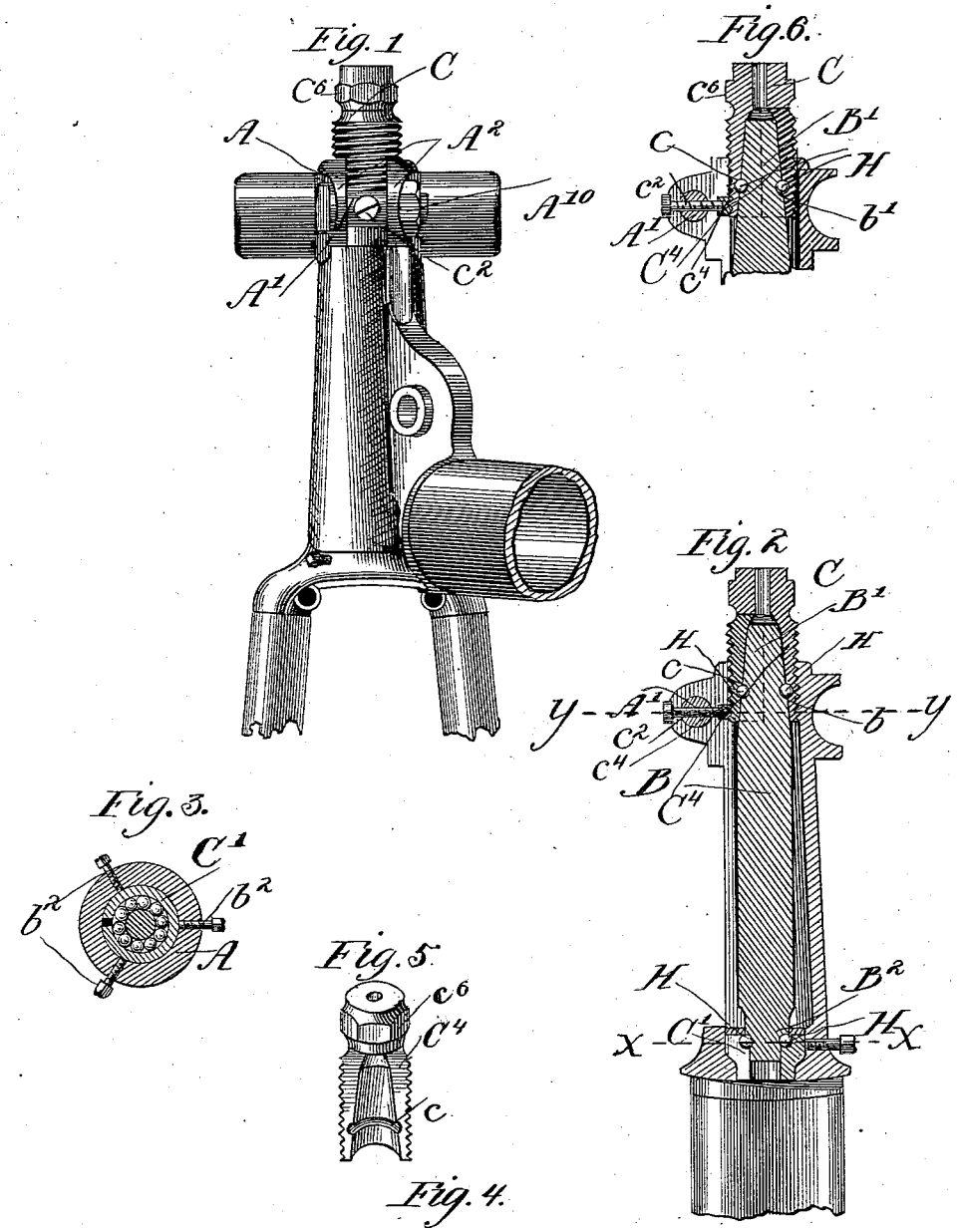
Witnesses:
Fred Gerlach.
Cora L. Cadwallader.
Inventor
Thos. B. Jeffery.
By Burton & Burton
Attys (No Model.) 3 Sheets—Sheet 2.

T. B. JEFFERY.
VELOCIPEDE.

No. 379,276. Patented Mar. 13, 1888.

Witnesses:
Fred Gerlach.
Cora L. Cadwallader.

Inventor:
Thos. B. Jeffery.
By Burton and Burton
his atty.

(No Model.) 3 Sheets—Sheet 3.

T. B. JEFFERY.
VELOCIPEDE.

No. 379,276. Patented Mar. 13, 1888.

Witnesses:
Fred Gerlach.
Cora L. Cadwallader.

Inventor:
Thos. B. Jeffery,
By Burton & Burton,
Atty's.

UNITED STATES PATENT OFFICE.

THOMAS B. JEFFERY, OF RAVENSWOOD, ILLINOIS.

VELOCIPEDE.

SPECIFICATION forming part of Letters Patent No. 379,276, dated March 13, 1888.

Application filed June 2, 1887. Serial No. 240,083. (No model.)

*To all whom it may concern:*

Be it known that I, THOMAS B. JEFFERY, a citizen of the United States, residing at Ravenswood, in the county of Cook and State of Illinois, have invented certain new and useful Improvements in Velocipedes, of which the following specification contains a full, exact, and true description, reference being had to the accompanying drawings, forming a part thereof.

Figure 9:
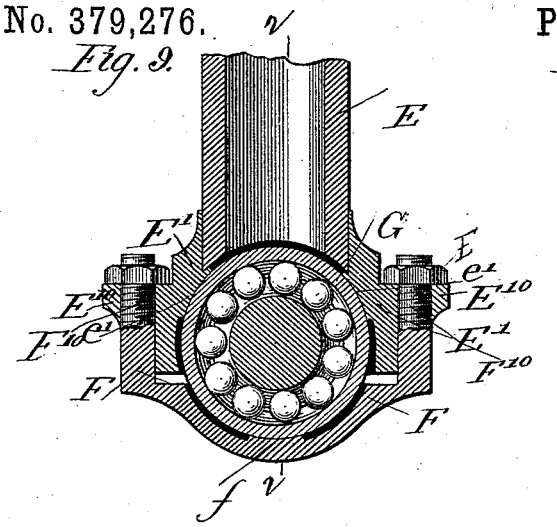
Figure 10:
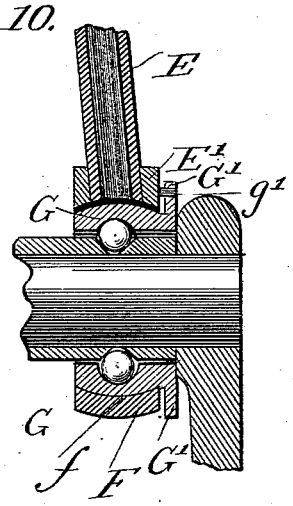
Figure 11:
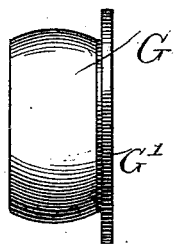
Figure 12:
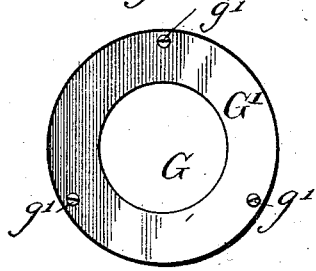
Figure 7:
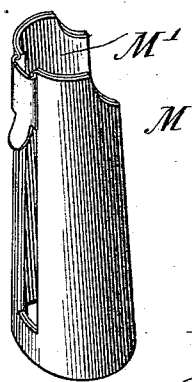
Figure 8:
Figure 13:
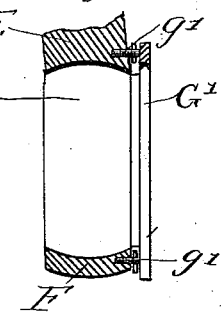
Figure 13:
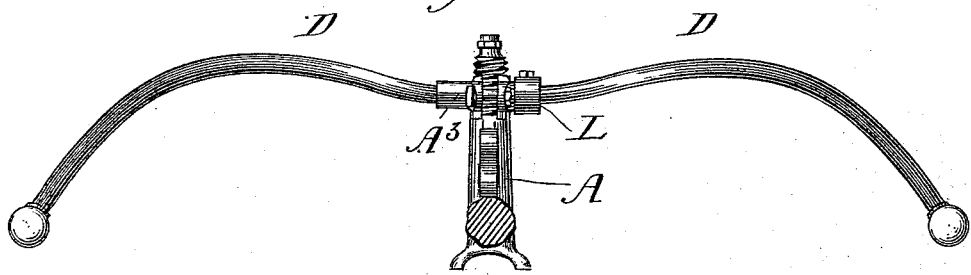
Figure 14:
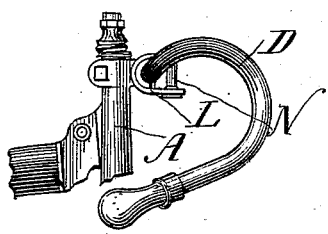
Figure 15:
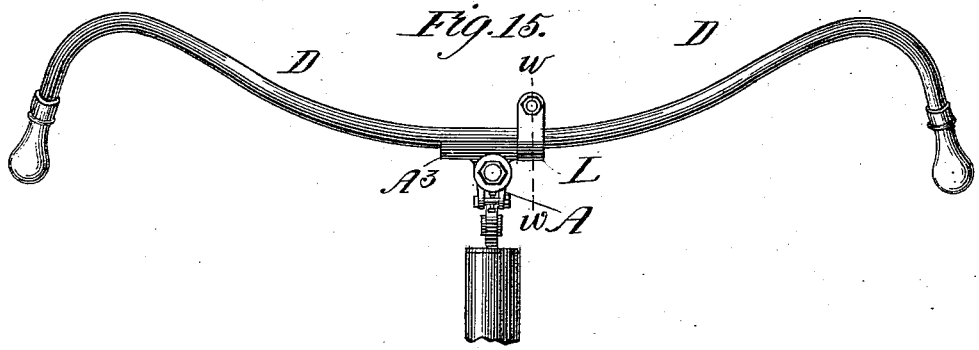
Figure 16:
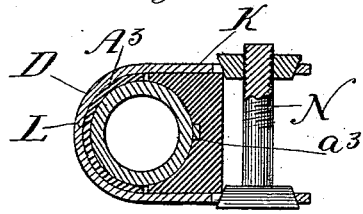
Figure 17:
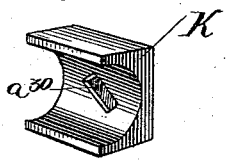
Figure 18:
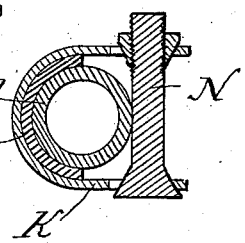

Figure 1 is a rear elevation of a bicycle-head, having the fork and backbone partly shown. Fig. 2 is an axial section of the head and neck taken in the plane of the drive-wheel—that is, from front to rear. Fig. 3 is a horizontal section through $x\,x$, Fig. 2. Fig. 4 is a horizontal section through $y\,y$, Fig. 2. Fig. 5 is a perspective of a piece of the neck-spindle-bearing sleeve. Fig. 6 is an axial section through the upper neck-spindle and its bearing, similar to the upper part of Fig. 2, but showing a slight modification. Fig. 7 is a perspective of a dust-shield for the steering-head. Fig. 8 is a horizontal section through the same. Fig. 9 is a vertical axial section through the axle-fork end and crank. Fig. 10 is a section through the line $v\,v$ on Fig. 9. Fig. 11 is an edge elevation, and Fig. 12 is a side elevation, of the bearing-case. Fig. 13 is a rear elevation of the handle-bar and portion of the head to which it is attached. Fig. 14 is a side elevation of the same. Fig. 15 is a plan of the same. Fig. 16 is a section through $w\,w$ on Fig. 15. Fig. 17 is a perspective of a clamping-block employed to secure the handle in the head. Fig. 18 is a sectional detail similar to Fig. 16, showing a form of handle-bar fastening in which the clamping-block is dispensed with. Fig. 19 is an edge elevation of the bearing-case and section of the fork, showing a form slightly modified from that shown in Fig. 10.

A is the head.

B is the neck.

C is the upper bearing-sleeve, and C' is the lower bearing-sleeve or step-box for the neck-spindles B' and B², respectively.

D is the handle-bar.

E is the fork.

F is the clamping-yoke attached to the yoke E' at the lower end of the fork E to retain the bearing-case G.

The head A is apertured at the rear in the usual manner to admit the neck B, and at the lower part is adapted to receive the lower bearing-sleeve or step-box, C', and at the upper part is properly chambered to admit the upper bearing sleeve, C, which may be either screwed into the head, as in Fig. 2, or inserted in a smooth-bored chamber, as in Fig. 6. In either construction the sleeve is held firmly in place in the head by the compression or clamping of the latter about it, which is effected by means of the cross-bolt A', passing through the rearwardly-projecting ears $A^2\,A^2$ and provided with the clamping-nut $A^{10}$.

The bearing-sleeve may be interiorly tapered to correspond to the taper of the spindle B', or it may be made to serve as a case for anti-friction balls H, which may be inserted in the mated semicircular annular grooves $c\,b'$ in the sleeve C and spindle B', respectively. In either construction (or if both are employed in the same head, as in Fig. 2) I arrange to adjust the sleeve to compensate for wear by splitting the sleeve C longitudinally, removing a small portion of material in doing so, and provide a clamp-screw or equivalent device in the head by which to compress the sleeve by forcing the divided parts together and thus closing them up around either the balls which form the bearing or around the spindle itself if it forms the bearing. The divided parts of the sleeve C are shown in Fig. 4, marked $C^2\,C^4$.

Since the wear which occurs in the steering-head—particularly that which affects the upper bearing of the neck—is almost wholly at the front and at the rear—that is, a plane parallel with the direction of travel—it is desirable that the adjustment to compensate for that wear should take effect in the same direction chiefly, so as not to bind the spindle laterally while adjusting its bearing to compensate for the wear in the other plane. For this reason I prefer to make the split in the sleeve C in a transverse plane, so that the two parts may be closed up from the rear or front. This is shown also in Fig. 4. This construction makes it most convenient to locate the screw which clamps the two parts of the split sleeve together at the rear, and, since the head is apertured at the rear to admit the neck, the most convenient place for the screw is set through the bolt A', which clamps the head about the sleeve, and I so locate it. This clamping-screw $c^2$ is screwed through the bolt A', and is preferably provided with a shoe, $c^4$, in which it is stepped, and which bears against the part $C^4$ of the sleeve C. When the sleeve is threaded, as in Fig. 2, the shoe $c^4$ is also correspondingly threaded, so that the thread on the sleeve may not be marred. When the sleeve is not screwed into the head, but inserted by direct longitudinal thrust and clamped in proper position, it is desirable sometimes to provide some more positive means than the clamping to prevent it from slipping longitudinally, and for that purpose it may itself be threaded, although the head itself has only a smooth bore to receive it, and such thread will serve as a serration, which will be engaged by the threaded or serrated face of the shoe $c^4$, which will then serve both as the shoe for the clamping-screw $c^2$ and as a detent for the serrated sleeve. This construction is practically illustrated in Fig. 6.

The lower sleeve, C', or step-box for the lower neck-spindle, $B^2$, is also preferably made as a case for anti-friction balls H, and in order to adjust said case to take up any wear therein I split the said sleeve or box C', as shown in Fig. 3, at one point, and through the head at three approximately equidistant points about the circumference I set three adjusting-screws, $b^2$ $b^2$ $b^2$, whose inner ends bear against the sleeve C' and serve to close it together and center it about the anti-friction balls. Only two of these screws—viz., those on either side of the split in the box—are necessary to close it together, since the box bears against the head itself at a point opposite; but the third screw is useful occasionally to center the box.

When a ball-bearing is employed at the upper end of the neck about the spindle B', the sleeve C becoming the case for the balls which form such bearing, it is necessary to divide that case in order to get the balls in place in the annular groove in the case and spindle, and therefore, in addition to splitting the sleeve longitudinally for the purpose of adjustment, as above described, I entirely divide the sleeve, preferably by a horizontal cut just below the polygonal head $C^6$, such cut extending half-way through and joining the longitudinal split, by which the possibility of adjustment for wear is effected. This mode of dividing the sleeve leaves the projecting head undivided, which is desirable both for appearance and for other reasons not pertaining to this invention.

The handle-bars D D are in the form of spirals of opposite and each of varying pitch—that is, it is of such shape as would be produced by winding a bar or rod around a cylinder in a varyingly oblique course, the direction of winding being opposite in the case of the two handles, so that in form they are not geometrically similar, but reciprocal. Starting from the center at the head the bar extends at first a short distance directly outward, forming a straight part which fits in the open-fronted cross-arm $A^3$ of the head, and is clamped and adjusted therein, as hereinafter explained. Thence it curves outward, upward, and forward, as passing up around and in front of a cylinder, then back still slightly upward and outward until its course has reached the top of the imaginary cylinder, which is the basis of its form, then rearward very slightly outward and downward, terminating pointing rearward slightly outward and obliquely downward, and at this point being adapted to receive the handles and present them in the most comfortable position for the hand of the operator. This form combines strength and elasticity, gives room for the proper play of the limbs underneath the upwardly and forwardly curved parts, affords comfortable resting-place for the limb when thrown over it, as is often done, to rest, and presents no abrupt turns, amounting to corners, on which the clothing can catch and effect a hinderance in mounting or dismounting.

I prefer to secure the handle-bar on the head by means of the clamping-block K and yoke L, whose ends are joined by the bolt N. The peculiarity of this fastening consists in the form of the head or nut, or both, of the bolt N and the adaptation of the apertures in the yoke L through which said bolt passes to co-operate with said head and nut. This peculiarity of form is seen in Fig. 16, the side of the head and nut which is toward the yoke being tapered and caused to enter the aperture in the end of the yoke, so that when the nut is tightened it not only draws the two ends of the yoke toward each other and causes the yoke to clamp the cross arm $A^3$ of the head, which prevents it from slipping off, but also, by forcing the tapered portion of the bolt-head and nut into the apertures of the yoke, forces the entire bolt back against the block or draws the yoke forward, so clamping the handle-bar by pressure from front to rear between the cross arm $A^3$ and the clamping-block K.

As a further means of preventing the handle-bar from slipping laterally—that is, endwise with respect to the handle-bar—or turning around, I provide said bar with the pins $a^3$, which enter slots $a^{30}$ in the inner side of the clamping-blocks; but in order that the handle-bar may be turned around slightly in the clamp, as is often desirable, to vary the height of the handles or the angle at which they may stand, I make said slots oblique, as seen in Fig. 17, so that by sliding the blocks slightly endwise the handle-bar will be turned therein. The oblique wall of the slot opposes the movement of the pin sufficiently to prevent it moving either longitudinally, to allow the handle-bar to slide endwise, or circularly, to permit the handle-bar to turn, but when the clamp is slightly loosened, the clamping-block being moved, will permit and cause either the longitudinal or the circular adjustment, as the operator may desire.

The dust cover or shield M is made of the usual form, adapted to be slipped onto the neck and follow it around about the head as the machine is turned, and thereby keep the aperture in the rear of the head always covered to exclude dust from the bearings. In order to prevent noise by the dust-cover rattling, if it is loose, or squeaking as the machine is turned, if the cover is tight, I provide it with an interior surface in contact with the head, made of some non-metallic substance, as hard (or even soft) rubber, gutta-percha, celluloid, cork, or leather. As shown in Fig. 7, this interior surface is provided by means of a lining, M', which is secured to the outer metal shell; but if hard rubber or celluloid or like rigid non-metallic substance is used the entire dust-cover may be made of it.

The bearing-case G contains the bearing for the axle. (As illustrated, it is a ball-bearing.) In order that the axle may revolve with perfect freedom it is necessary that the bearing should be perfectly aligned with the axle, and to insure such alignment it is best that the bearing-case should at first be loose in the fork end in order that it may assume the correct position under the guidance of the axle, and when the parts are all in final position the case is best made fast in the fork. In order that this may be done securely and at the same time with the least danger of flattening the bearing-case by the pressure which clamps it in the fork, I prefer to so construct the clamp that the case shall be pressed by it at three points or on three sides approximately equidistant. To this end the fork end E is divided and shaped into the open half-yoke E', which is spherically concaved to fit the bearing-case, but recessed so as to leave only limited bearing-surfaces e' e' about one hundred and twenty degrees apart, measuring from their middle points. The half-yoke F is formed similarly concaved spherically, but is recessed so as to leave only one limited bearing-surface, f, which is located opposite a point midway between the bearing-surfaces e' e'. The half-yoke E' is provided with the lateral ears or lugs E¹⁰ E¹⁰, apertured to receive the bolt ends F¹⁰ F¹⁰, with which the half-yoke F is made to terminate. Nuts F¹¹ serve to secure the two half-yokes together, inclosing the bearing-case G, and to clamp them about said case to cause them to hold it firmly when it has once assumed its true position of alignment with the axle. In order, however, that it may not be necessary to clamp it excessively to the danger of straining the clamping-yokes and flattening or bulging the case, I provide the latter with the lateral flange G', which laps on the yokes E' and F all around the bearing and has set through it three stop-screws, g' g' g'. When the bearing-case is aligned and clamped, these screws are set up against the side of the yokes, and, being distributed at about equal distances in the circumference of the flange, they stop the case G against any tendency to change its position in the clamping-yokes even though it may be very lightly clamped by them. Obviously the stops may be set into the side of the fork as well as in the flange of the bearing-case. Such a construction is shown in Fig. 19, and in that figure there are shown only two instead of three such stops, and such a construction may be employed quite efficiently by locating the two stops in the line of greatest liability to distortion, although the employment of three is to be preferred for obvious reasons.

It has been customary to join the yoke which terminates the fork to the fork end by means of a projecting nipple from the yoke which enters and is brazed within the tubular fork end. I prefer, however, to form an aperture in the upper bow of the yoke E' and insert the end of the tubular fork into such aperture, where it may be securely brazed. This construction avoids the danger which is encountered in the other—viz., that a severe strain is liable to split the fork end, the inserted nipple acting as a prying wedge to effect that result—whereas in my construction the yoke serves to strengthen the fork end against splitting.

I claim—

1. In a velocipede, in combination with the head and neck, the bearing-sleeve for the neck secured within the head, longitudinally split from one end toward the other, substantially as set forth.

2. In a velocipede, in combination with the head and neck, the bearing-sleeve for the neck secured within the head and vertically split from one end toward the other in a plane transverse to the line of travel, substantially as and for the purpose set forth.

3. In a velocipede, in combination with the head and neck, the bearing-sleeve for the neck secured within the head, formed of two pieces, substantially as set forth.

4. In a velocipede, in combination with the head and neck, the bearing-sleeve for the neck, formed in two pieces by a longitudinal division in a plane transverse to the line of travel and secured within the head, substantially as and for the purpose set forth.

5. In a velocipede, in combination with the head and neck, the bearing-sleeve for the neck secured within the head, formed of two pieces and threaded into the head, substantially as set forth.

6. In a velocipede, in combination with the head and neck, a bearing-sleeve formed of two pieces by being split vertically from the lower end upward and thence laterally to the surface, substantially as set forth.

7. In a velocipede, in combination with the head and neck, the bearing-sleeve for the neck-spindle, formed of two pieces by being split from the lower end upward in a plane transverse to the line of travel and thence to the surface in a plane transverse to the plane of the neck-spindle, substantially as set forth.

8. In a velocipede, in combination with the head, the bearing-sleeve secured therein and divided longitudinally into two pieces, the neck projecting into such sleeve, and the anti-friction balls forming the bearing within said sleeve for the neck, substantially as set forth.

9. In a velocipede, in combination with the head and neck, the bearing-sleeve for the neck, formed of two pieces, and a screw acting through the head tending to compress the two pieces of the sleeve, substantially as set forth.

10. In a velocipede, in combination with the head and neck, the bearing-sleeve for the neck, longitudinally split transversely to the line of travel, and a screw acting through the head tending to compress the two pieces of the sleeve, substantially as set forth.

11. In a velocipede, in combination with the head and neck, the bearing sleeve for the neck, formed of two pieces clamped by the head, and a screw acting through the head tending to compress the two pieces of the sleeve, the sleeve being clamped by the head in a plane transverse to that in which its two parts are compressed by the screw, substantially as set forth.

12. In a velocipede, in combination, the head, the neck, the bearing sleeve for the neck, formed of two parts, a bolt which clamps the head about the bearing-sleeve, and a screw passing through the bolt and setting against the sleeve, substantially as and for the purpose set forth.

13. In a velocipede, in combination, the head, the neck, a bearing-sleeve formed of two pieces and serrated on its exterior surface, a bolt adapted to clamp the head about the sleeve, and a screw passing through the bolt and pressing against the sleeve by means of an intervening shoe having its surface serrated to fit against the sleeve, substantially as set forth.

14. In combination with the head, the neck, and the bearing sleeve or box for the neck-spindle, said box being split longitudinally on one side, and two clamp-screws set through the head and impinging on the sleeve on opposite sides of the split in the box and less than one hundred and eighty degrees apart, whereby the box may be closed up by pressure along converging but not diametrically-opposite lines, substantially as set forth.

15. In combination with the neck, the head, and the bearing sleeve or box, said sleeve or box being longitudinally split on one side and inserted in the head, three clamp-screws set through the head against the sleeve or box at intervals of which each is less than one hundred and eighty degrees.

16. In a velocipede, in combination with the head, the neck therein, anti-friction balls forming the bearing for the lower end of the neck, a ball-case longitudinally split, and screws set through the head converging from three sides to compress and adjust the case, substantially as set forth.

17. In a velocipede, in combination with the head, a dust cover or shield having its inner surface, which is in contact with the head, of hard rubber, celluloid, or similar non-metallic substance, substantially as set forth.

18. In a velocipede, in combination with the axle, the fork having each of its lower ends provided with a yoke and the bearing-case clamped within the yoke by three points of contact approximately equidistant, substantially as set forth.

19. In combination with the axle, the fork divided at its lower end to form a half-yoke and expanded into ears at the ends of such half-yoke, having apertures to receive bolts, a mated half-yoke which terminates in bolt ends which enter said apertures, and clamping-nuts on such bolt ends to draw the two half-yokes together, and the bearing-case embraced between such half-yokes, one of said half-yokes having one interior bearing for the bearing-box and the other having two such bearings, substantially as set forth.

20. In a velocipede, in combination with the axle, the fork, a bearing-case having a projecting flange upon two or more edges, and three adjusting-screws in such flange adapted to stop against the surface of the fork, substantially as set forth.

21. In a velocipede, in combination with the axle, substantially as and for the purpose set forth, the fork and the bearing-case, one of said parts having two or more adjustable stops abutting against the other.

22. A velocipede handle-bar in the form of a spiral of varying pitch commencing at the head in a course almost directly outward and ending at the handle in a course pointing rearward, substantially as set forth.

23. A velocipede handle-bar in the form of a spiral of varying pitch whose axis is horizontal and transverse to the line of travel.

24. A velocipede handle-bar in the form of a spiral of varying pitch from the head to the handle and opposite pitch on opposite sides of the head, substantially as set forth.

25. A velocipede handle-bar which extends from the head in an ever-changing curve first upward and forward slightly and mainly outward, changing to a direction downward, forward, and outward, then changing to direction downward and rearward mainly and slightly outward, substantially as set forth.

26. In combination, substantially as set forth, the head having the cross-arm to receive the handle-bar, the clamping-block, the handle-bar, and the clamping-yoke, the handle-bar and the clamping-block having one a recess and the other a pin projecting into the recess, whereby the handle-bar is retained securely in position.

27. In combination, substantially as set forth, the head having the cross-arm to receive the handle-bar, the clamping-block, the clamping-yoke having apertured ears to receive a connecting-bolt, said bolt having a shank of uniform diameter and its head tapering out from the shank and adapted to enter the apertures in the clamp-ears, and a nut to draw the bolt, whereby the taper of the bolt-head causes it to force the clamping-block toward the cross-arm of the head to clamp the handle-bar between them.

28. In combination, substantially as set forth, the head having the cross-arm to receive the handle-bar, the clamping-block, the clamping-yoke having apertured ears to receive a connecting-bolt, said bolt having a shank of uniform diameter and its head tapered out from the shank and adapted to enter the aperture in one clamp ear, and a nut similarly tapered at the inner end and adapted to enter the aperture in the other clamp-ear to draw the bolt, whereby the taper of the bolt-head and nut forces the clamping-block toward the cross-arm of the head to clamp the handle-bar between them.

29. In combination, substantially as set forth, the head having the cross-arm to receive the handle-bar, the clamping-block, and the clamping-yoke having apertured ears to receive the connecting-bolt provided with a nut, which tapers at the inner end and enters the aperture in the clamp-ears as it is advanced onto the bolt, whereby it forces the clamping-block toward the cross-arm and causes it to clamp the handle-bar between them.

30. In a velocipede, in combination, substantially as set forth, the head having the cross-arm to receive the handle-bar, the clamping-yoke having apertured ears to receive a connecting-bolt, said bolt having a shank of uniform diameter and its head tapering out from the shank and adapted to enter the apertures in the clamp-ears, and a nut to draw the bolt, whereby the taper of the bolt-head forces the bolt toward the cross-arm of the head to clamp the handle-bar between them.

31. In a velocipede, in combination, substantially as set forth, the head having the cross-arm to receive the handle-bar, the clamping-yoke having apertured ears to receive a connecting-bolt, said bolt having a shank of uniform diameter and its head tapering out from the shank and adapted to enter the aperture in one clamp-ear, and a nut similarly tapered at the inner end, adapted to enter the aperture in the other clamp-ear to draw the bolt, whereby the taper of the bolt-head and nut forces the bolt toward the cross-arm of the head to clamp the handle-bar between them.

Chicago, Illinois, May 16, 1887.

THOS. B. JEFFERY.

In presence of—
    CHAS. S. BURTON,
    E. F. BURTON.